United States Patent
Fang et al.

(10) Patent No.: US 10,103,804 B2
(45) Date of Patent: Oct. 16, 2018

(54) APPARATUS AND METHOD FOR OPTIMIZING THE POWER UTILIZATION OF A SATELLITE SPOT BEAM TRANSPONDER FOR A MULTICARRIER TRANSMISSION

(71) Applicant: Hughes Network Systems, Germantown, MD (US)

(72) Inventors: Russell Fang, Potomac, MD (US); Rohit Iyer Seshadri, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 1 day.

(21) Appl. No.: 14/588,322

(22) Filed: Dec. 31, 2014

(65) Prior Publication Data
US 2016/0191145 A1     Jun. 30, 2016

(51) Int. Cl.
*H04B 7/185* (2006.01)

(52) U.S. Cl.
CPC .......... *H04B 7/18513* (2013.01); *Y02D 70/00* (2018.01); *Y02D 70/168* (2018.01); *Y02D 70/22* (2018.01); *Y02D 70/446* (2018.01)

(58) Field of Classification Search
CPC ................................................. H04B 7/18513
See application file for complete search history.

(56) References Cited

U.S. PATENT DOCUMENTS

| | | | | |
|---|---|---|---|---|
| 5,754,942 A | * | 5/1998 | Wachs | G01R 19/25 455/9 |
| 5,924,015 A | * | 7/1999 | Garrison | H04B 7/18543 455/13.4 |
| 6,055,431 A | * | 4/2000 | Dybdal | H04B 7/18515 455/13.4 |
| 6,091,934 A | * | 7/2000 | Berman | H03F 1/0222 455/103 |
| 6,101,385 A | * | 8/2000 | Monte | H04B 7/18539 455/12.1 |
| 6,157,812 A | * | 12/2000 | Sarraf | H04B 7/18515 370/316 |
| 6,388,634 B1 | * | 5/2002 | Ramanujam | H01Q 1/288 343/781 P |

(Continued)

*Primary Examiner* — Gregory Sefcheck
*Assistant Examiner* — Jael Ulysse
(74) *Attorney, Agent, or Firm* — Potomac Technology Law, LLC

(57) ABSTRACT

An approach for optimizing power utilization of a satellite transponder, and thereby optimizing achievable modulation/coding schemes and data rates for terminals across the transponder beam, is provided. A signal power level is allocated to each of a plurality of carriers. The plurality of carriers are to be transmitted within a downlink beam via a transponder, each of the carriers is associated with a region of the beam, and the total power allocated to the carriers does not exceed a desired aggregate power level for the transponder. The signal power allocated to each carrier is determined relative to a gain realizable by satellite terminals within the respective beam region and assigned to receive the respective carrier, and the realizable gain of the terminals is based on locations within the beam. The signal power level allocated to each carrier is different from the power allocated to the other carriers.

12 Claims, 7 Drawing Sheets

(56) References Cited

U.S. PATENT DOCUMENTS

| | | | |
|---|---|---|---|
| 2002/0057745 A1* | 5/2002 | Friedman | H04B 7/18515 375/295 |
| 2002/0058478 A1* | 5/2002 | de La Chapelle | H04B 7/18506 455/13.4 |
| 2002/0068526 A1* | 6/2002 | Butte | H04B 7/18515 455/13.1 |
| 2002/0089956 A1* | 7/2002 | Haugli | H04B 7/18513 370/335 |
| 2002/0137457 A1* | 9/2002 | Nivens | H04B 7/18513 455/13.4 |
| 2002/0168974 A1* | 11/2002 | Rosen | H04B 7/18513 455/427 |
| 2003/0043761 A1* | 3/2003 | Hladik | H04B 7/212 370/319 |
| 2003/0073436 A1* | 4/2003 | Karabinis | H04B 7/18563 455/429 |
| 2003/0087606 A1* | 5/2003 | Dybdal | H04B 7/18513 455/67.11 |
| 2003/0134635 A1* | 7/2003 | Lane | H04B 7/18515 455/428 |
| 2003/0203737 A1* | 10/2003 | Jarett | H04B 7/2041 455/450 |
| 2004/0092257 A1* | 5/2004 | Chung | H04B 7/2125 455/429 |
| 2004/0166801 A1* | 8/2004 | Sharon | H04B 7/18584 455/12.1 |
| 2005/0085186 A1* | 4/2005 | Sandrin | H04B 7/18513 455/12.1 |
| 2005/0220057 A1* | 10/2005 | Monsen | H04L 1/0041 370/334 |
| 2005/0272472 A1* | 12/2005 | Goldberg | H04W 16/28 455/562.1 |
| 2006/0025178 A1* | 2/2006 | Tao | H04B 7/0617 455/562.1 |
| 2006/0181455 A1* | 8/2006 | Hudson | H01Q 1/1257 342/359 |
| 2006/0285481 A1* | 12/2006 | Lane | G06Q 50/22 370/208 |
| 2007/0082609 A1* | 4/2007 | Kiesling | H04B 7/2041 455/12.1 |
| 2010/0309828 A1* | 12/2010 | Nguyen | H04B 7/18539 370/281 |
| 2011/0189948 A1* | 8/2011 | Miller | H04B 7/18515 455/13.4 |
| 2011/0222589 A1* | 9/2011 | Howell | H04B 7/18519 375/213 |
| 2012/0114022 A1* | 5/2012 | Lever | H04B 7/18515 375/214 |
| 2012/0121023 A1* | 5/2012 | Antia | H04N 7/20 375/240.24 |
| 2012/0213174 A1* | 8/2012 | Manea | H04L 1/0003 370/329 |
| 2012/0301136 A1* | 11/2012 | Chang | H04B 7/0413 398/16 |
| 2013/0070666 A1* | 3/2013 | Miller | H04B 7/212 370/326 |
| 2013/0329630 A1* | 12/2013 | Becker | H04W 56/0015 370/326 |
| 2014/0065950 A1* | 3/2014 | Mendelsohn | H04B 7/18517 455/12.1 |
| 2014/0099884 A1* | 4/2014 | Lozano | H04M 15/81 455/12.1 |

* cited by examiner

APPARATUS AND METHOD FOR OPTIMIZING THE POWER UTILIZATION OF A SATELLITE SPOT BEAM TRANSPONDER FOR A MULTICARRIER TRANSMISSION

BACKGROUND

Broadband technologies are taking a predominant role in the emerging information society, and, in particular, broadband satellite communication systems are being broadly employed to respond to the growing requirements of the information society. More specifically, based on global access and broadcasting capabilities, satellite communication systems are well suited to provide broadband services to remote locations and highly mobile users (e.g., broadband services provided to rural areas and to ships, aircraft, trains, etc.), as well as to major metropolitan areas of high population density and high broadband demands. Accordingly, the overall demand for broadband capacity continues to increase exponentially, however, bandwidth availability limitations of satellite systems continues to be a predominant issue in the growth of this communications technology.

In order to satisfy the growth in demand for high availability broadband capacity, broadband satellite communications systems that deploy high throughput satellites are becoming more prevalent. High throughput satellite (HTS) is a classification for a communications satellite that provides upwards of more than 20 times the total throughput of a classic FSS geostationary communications satellite (e.g., throughputs of more than 100 Gbit/sec of capacity are currently being deployed, which amounts to more than 100 times the capacity of a conventional Ku-band satellite). Such satellites typically utilize the same amount of allocated orbital spectrum, and thus significantly reducing cost-per-bit. The significant increase in capacity of an HTS system is achieved, in part, by a high level frequency re-use and spot beam technology, which enables frequency re-use across multiple narrowly focused spot beams (usually in the order of 100's of kilometers). The signal strength received at the earth surface within a narrow spot beam footprint, from a multiple beam satellite, however, varies with the distance between the receiving terminal and the beam center on the ground. For a given transmitter power of the satellite transponder, the effective isotropic radiated power (EIRP) in dBW, at the earth surface, decreases relative to the beam center, in accordance with the satellite antenna gain pattern. In other words, the gain or received power for a terminal located at or near the beam center is at a peak level, and that power or gain decreases (relative to the beam center) as a terminal location moves away from the beam center towards the beam edge (e.g., in some current systems, by as much as approximately 4 dB from beam center to beam edge).

Accordingly, based on terminal location and the higher realized gain, a terminal at or near the beam center can receive data transmitted at a higher modulation and coding scheme and with less transmit power, which increases the bandwidth efficiency to that terminal (e.g., increases the realized bits/Hz/sec transmitted to that terminal at a lower transmit power). Similarly, based on terminal location and the lower realized gain, a terminal further away from the beam center (and at a worst case near the beam edge) requires a higher transmit power level to receive and reliably decode transmissions at the higher modulation and coding schemes, and thus cannot realize the same bandwidth efficiency as the terminals closer to the beam center. Moreover, in current systems, however, all carriers within a given beam of a wideband transponder (e.g., sharing a single transponder) are typically transmitted at a common power level. In that regard, based on a terminal location, the modulation and coding scheme that the terminal is able to receive and reliably decode is limited (e.g., based on the associated intermodulation distortion and signal to noise ratio at that terminal). With a common power level transmission across all carriers of a beam, however, the modulation and coding must be set to accommodate the worst case link margin scenario (e.g., for the terminals at the beam edge). Such a scenario, therefore, fails to take into consideration the advantaged terminals (based on their location with respect to the beam center) and the fact that such terminals do not require the transmitted power level for the assigned modulation and coding. Accordingly, such a scenario results in an inefficient utilization of the available transmit power across the beam, and correspondingly an inefficient utilization of the total bandwidth capacity potential of the beam based on the total available power.

What is needed, therefore, is an approach for optimizing the power utilization of a satellite spot beam transponder, and thereby optimizing the modulation and coding scheme assignments and the associated data rate for terminals across the entire transponder beam, including terminals located at the more disadvantaged locations within the beam (e.g., at the beam edges as opposed to the beam center).

SOME EXEMPLARY EMBODIMENTS

The present invention advantageously addresses the foregoing requirements and needs, as well as others, by providing an approach for optimizing the power utilization of a satellite spot beam transponder, and thereby optimizing the modulation and coding scheme assignments and the associated data rate for terminals across the entire transponder beam, including terminals located at the more disadvantaged locations within the beam (e.g., at the beam edges as opposed to the beam center). In accordance with example embodiments of the present invention, an approach is provided whereby carrier power assignments are adjusted across a satellite beam to maximize the FDMA spot beam transponder capacity and the associated data rate for terminals across the entire satellite beam.

According, to example embodiments of the present invention, a method comprises allocating a signal power level to each of a plurality of carriers for a multicarrier satellite transmission. The plurality of carriers are to be transmitted within a downlink beam via a satellite transponder, each of the carriers is associated with a respective region of the downlink beam, and the total power allocated to the carriers does not exceed a desired aggregate power level for the transponder. The signal power level allocated to each carrier is determined relative to a gain realizable by at least one satellite terminal within the respective beam region and assigned to receive the respective carrier, and the realizable gain of the at least one satellite terminal is based on its location within the downlink beam. The signal power level allocated to at least one of the carriers is different from the signal power level allocated to at least another one of the carriers.

By way of example, each satellite terminal within a given region is assigned to receive the respective carrier associated with that region, and the allocation of the signal power level to each carrier is configured to maximize the level of modulation and coding schemes realizable by the satellite terminals of each region and the overall downlink beam. By way of further example, for the allocation of the signal power level to each carrier, the at least one satellite terminal, relative to which the signal power level is allocated, is at a location within the respective beam region whereby the realizable gain is at a relatively minimum level for the beam region. By way of further example, the beam regions are bounded by concentric rings located successively further out from a center of the downlink beam, a center region is bounded by a first ring closest to the beam center, and each successive region is bounded by the outer ring of the preceding region and the next outer ring. Further, the beam regions may be formed such that each region contains a relatively equal number of satellite terminals as the other regions. By way of further example, for the allocation of the signal power level to each carrier, the at least one satellite terminal, relative to which the signal power level is allocated, is located at the outer ring of the respective beam region.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An approach for an approach for maximizing the FDMA spot beam transponder capacity and maximizing the associated data rate for terminals across an entire satellite beam, including terminals located at the more disadvantaged locations within the beam (e.g., at the beam edges as opposed to the beam center), is described. In accordance with example embodiments, an approach is provided whereby carrier power assignments are adjusted across a satellite beam to maximize the FDMA spot beam transponder capacity and the associated data rate for terminals across the entire satellite beam.

In the following description, for the purposes of explanation, numerous specific details are set forth in order to provide a thorough understanding of the present invention. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Figure 1A:
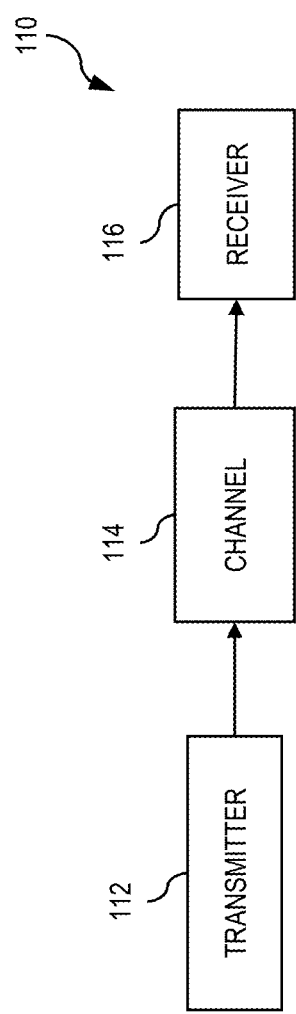
FIGS. 1A, 1B and 1C illustrate traditional satellite communications systems.
Figure 1B:
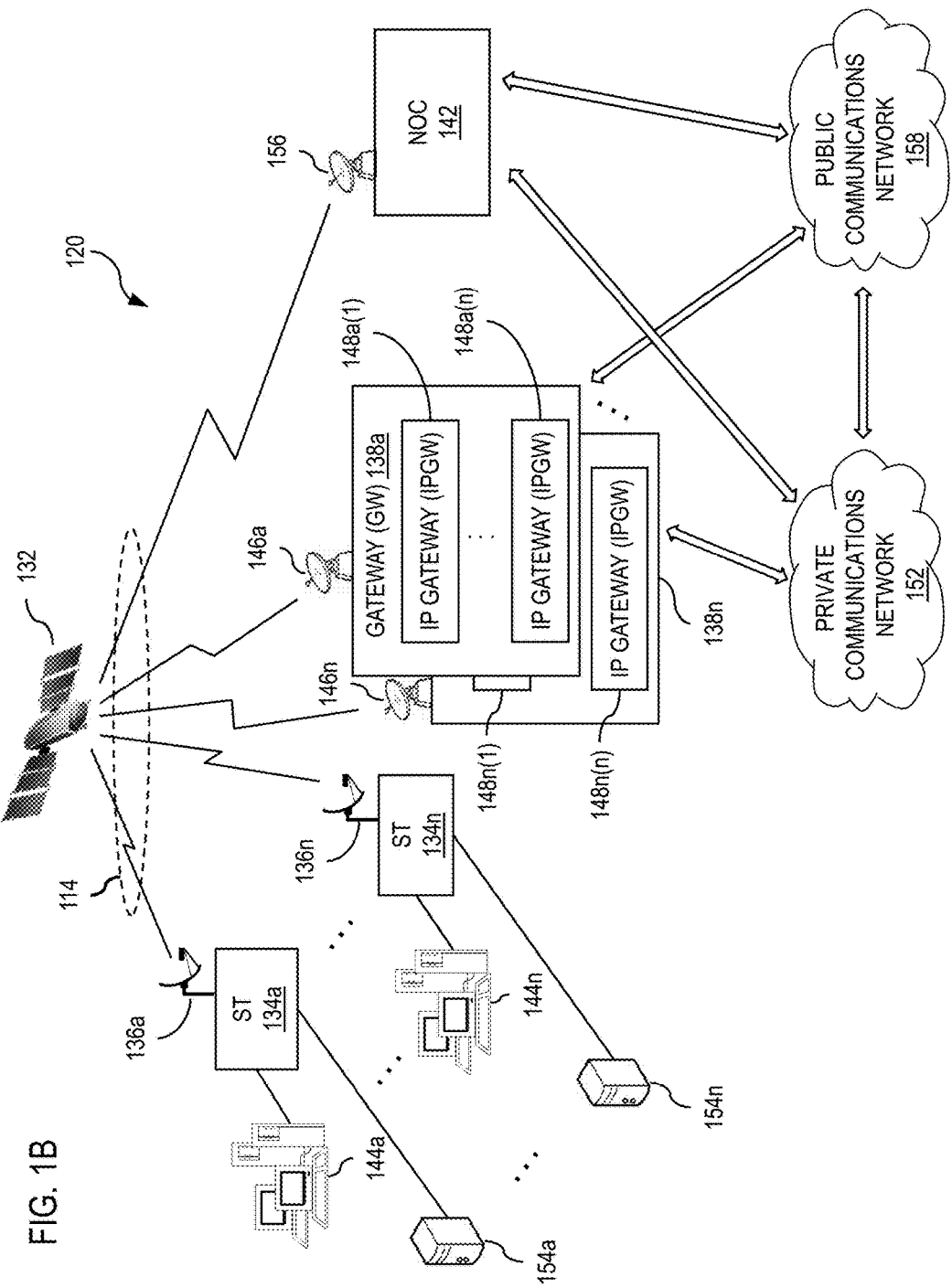
Figure 1C:
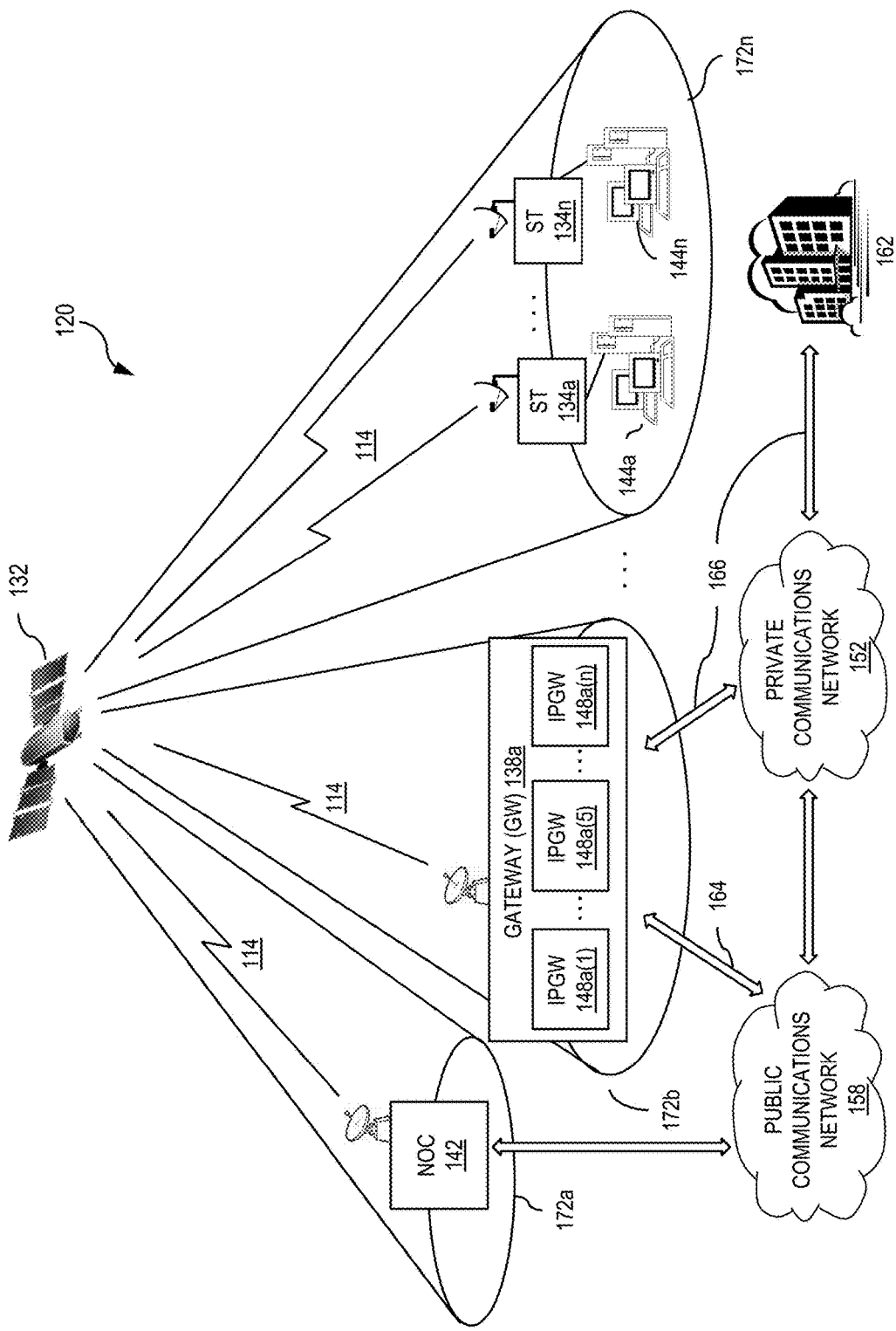

FIGS. 1A-1C illustrate diagrams of communications systems, according to various example embodiments of the present invention. With reference to FIG. 1A, a broadband communications system 110 includes one or more transmitters 112 (of which one is shown) that generate signal waveforms for transmission to one or more receivers 116 (of which one is shown). The signal waveforms are transmitted across a communications channel 114, which (for example) may comprise a channel of a terrestrial, wireless terrestrial or satellite communications system. In this discrete communications system 110, the transmitter 112 has a signal source that produces a discrete set of data signals, where each of the data signals is transmitted over a corresponding signal waveform. The discrete set of data signals may first be encoded (e.g., via a forward error correction code) to combat noise and other issues associated with the channel 114. Once encoded, the encoded signals may then be modulated onto a carrier for transmission over the channel 114. The signal waveforms are attenuated, or otherwise altered, by communications channel 114.

FIG. 1B illustrates a satellite communications system 120 capable of supporting communications among terminals with varied capabilities, according to example embodiments. Satellite communications system 120 includes a satellite 132 that supports communications among multiple satellite terminals (STs) 134a-134n, a number of gateways (GWs) 138a-138n, and a network operations center (NOC) 142. The STs, GWs and NOC transmit and receive signals via the antennas 136a-136n, 146a-146n, and 156, respectively. According to different embodiments, the NOC 142 may reside at a separate site reachable via a separate satellite channel or may reside within a GW site. The NOC 142 performs the management plane functions of the system 120, while the GWs 138a-138n perform the data plane functions of the system 120. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one exemplary embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 138a-138n include one or more IP gateways (IP-GWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be co-located with the NOC 142. The STs 134a-134n provide connectivity to one or more hosts 144a-144n and/or routers 154a-154n, respectively. The Satellite communications system 120 may operate as a bent-pipe system, where the satellite essentially operates as a repeater or bent pipe. Alternatively, the system 120 may employ a switching or processing satellite supporting mesh communications (point-to-point communications directly between, for example, the two STs 134a and 134n).

In a bent-pipe system of an example embodiment, the satellite 132 operates as a repeater or bent pipe, and communications to and from the STs 134a-134n are transmitted over the satellite 132 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1C, for example, for a data communication from ST 134a to a public communications network 158 (e.g., the Internet), the ST 134a is associated with an IPGW (e.g., IPGW 148a(1)—selected from a pool of IPGWs available to the ST 134a, such as IPGWs 148a(1)-148a(5)—where the pool of IPGWs is a suitable subset of the IPGWs 148a(1)-148a(n) located at the GW 138a). The data is first transmitted, via the satellite 132, from the ST 134a to associated IPGW 148a(1). The IPGW 148a(1) determines the destination as being the Internet 158. The IPGW then repackages the data (e.g., as a TCP/IP communication), and routes the data communication, via the terrestrial link 164, to the Internet 158. Further, in a corporate network, for example, a corporation may deploy various remote STs at remote offices. More specifically, ST 134n, located at a remote corporate location, may desire to securely communicate with the corporate headquarters 162. Accordingly, for a data communication from ST 134n to the corporate headquarters 162, the data is first transmitted, via the satellite 132, from the ST 134n to an IPGW associated with the ST 134n (e.g., IPGW 148a(5)). The IPGW 148a(5) determines the destination as being the corporate headquarters 162. The IPGW then repackages the data (e.g., as an IPsec communication), and routes the IPsec data communication, via the secure terrestrial links 166 (over the private network 152), to the corporate headquarters 162. In the corporate network scenario, a further example involves a corporate communications from the corporate headquarters to a number of remote sites (e.g., a multicast communication to STs 134a-134n)—where STs 134a-134n are correspondingly associated with the two IPGWs 148a(1) and 148a(5) (e.g., grouped between the two IPGWs based on load balancing and IPGW capabilities). In this scenario, a gateway or router, within the local network of corporate headquarters 162, transmits the data communication, via the secure terrestrial links 166 (over the private network 152), to the IPGWs 148a(1) and 148a(5). The IPGWs determine that the communication is destined for the remote STs 134a-134n, and package the data as a multicast communication addressed to the community of STs 134a-134n. The IPGWs then transmit the data communication, via the satellite 132, for decoding by the community of STs 134a-134n. Accordingly, the satellite of such a system acts as a bent pipe or repeater, transmitting communications between the STs 134a-134n and their respective associated IPGWs 148a-148n.

As specified above, an HTS system achieves a significant increase in capacity, in part, by a high level frequency re-use and spot beam technology, which enables frequency re-use across multiple narrowly focused spot beams (usually in the order of 100's of kilometers). The signal strength received at the earth surface within a narrow spot beam footprint, from a multiple beam satellite, however, varies with the distance between the receiving terminal and the beam center on the ground. For a given transmitter power of the satellite transponder, the effective isotropic radiated power (EIRP) in dBW decreases relative to the beam center at the earth surface changes in accordance with the satellite antenna gain pattern. This EIRP decrease in dB can be roughly expressed by $-\alpha(\theta/\theta_0)^2$, where $\theta$ is the distance between terminal location relative to the beam center (in satellite antenna coordinates), $\theta_0$ is the beam width of the spot beam, and $\alpha$ is the antenna gain pattern loss at the edge of the spot beam. Typically, $\alpha$ is about 4 to 5 dB. Thus the satellite signal strength received by a terminal located at the beam edge is about 4 to 5 dB lower than the signal strength received by a terminal (having the same receiver sensitivity) located at the beam center.

For outroute transmissions from a hub earth station (via the satellite) to a remote terminal (e.g., a very small aperture terminal or VSAT), adaptive coded modulation (ACM) is employed to match the received C/(N+I) or Es/No at the receiving remote terminals (a description of the ACM that is employed in current typical broadband satellite systems is described in the Digital Video Broadcasting, Satellite, 2$^{nd}$ Generation (DVB-S2) standard, ETSI EN 302 307). If the channel condition changes due to rain fades at Ku or Ka band, the ACM mechanism at the hub or gateway automatically changes the forward error correction (FEC) code rate and modulation format to match or accommodate for the channel condition. If the respective spot beam is served by a single carrier from the hub station, in a time-division-multiplexed (TDM) fashion or in a time-division-multiple-access (TDMA) fashion over the transponder, then the ACM applied to the transmission would maximize the capacity of the respective spot beam.

Figure 2A:
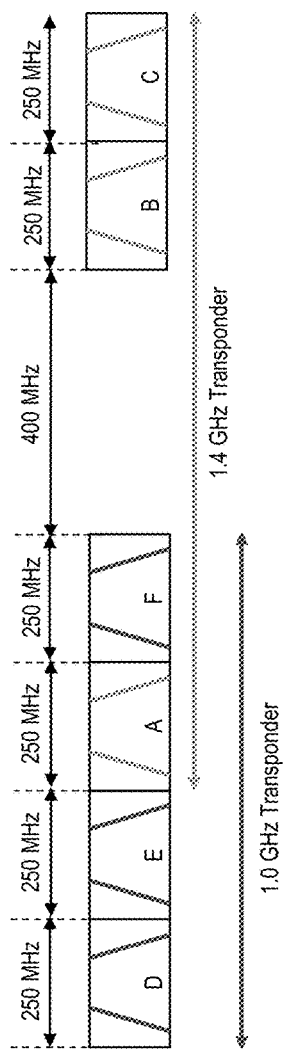
FIG. 2A illustrates an example satellite transponder frequency plan for a 1.4 GHz transponder and for a 1 GHz transponder.
Figure 2B:
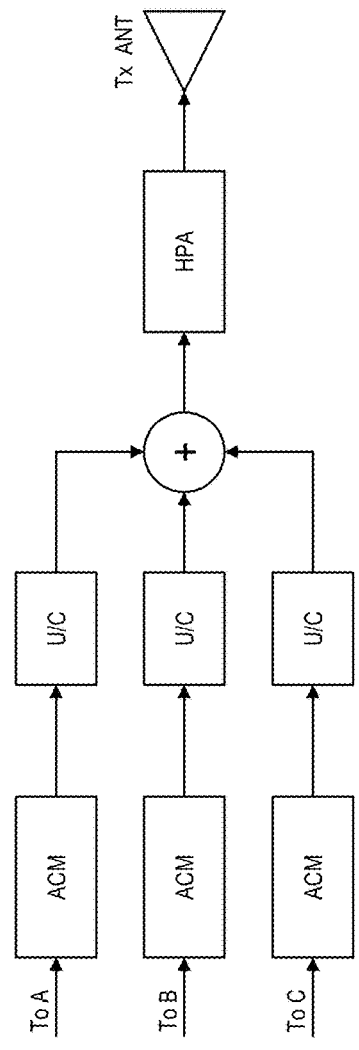
FIG. 2B illustrates an example gateway hub transmission chain relative to the 1.4 GHz transponder of FIG. 2A.

For a modern multiple spot beam satellite payload design, however, TDM and/or TDMA access of a wide band beam may not be desirable after performing the payload size, weight and power (SWaP) trades, including the complexity of uplink/downlink beam/transponder connectivity and redundancy, for satisfying the overall satellite coverage and capacity requirements. Instead, a frequency-division-multiple-access (FDMA) mode of accessing the wideband spot beam may be more desirable. In the case of some current HTS systems, for example, each hub station may serve four or more user spot beams (e.g., of 750 MHz each). More specifically, in such examples, each user beam may carry 750 MHz worth of traffic, either via a 1.4 GHz transponder or a 1 GHz transponder, as illustrated in FIG. 2A. With reference to FIG. 2A, the three carriers A, B, C, each being 250 MHz, are transmitted via a 1.4 GHz transponder (with a 400 MHz gap), and the three carriers D, E, F, each being 250 MHz are transmitted via a 1 GHz transponder, as shown. Further, FIG. 2B illustrates the hub transmission chain at the gateway using the 1.4 GHz transponder. Each of the signals for the three carriers passes through a respective adaptive coding and modulation module (ACM) and up-converter module (U/C), and are then multiplexed together and passed through the transponder high power amplifier (HPA) for transmission via the gateway transmit antenna (Tx ANT). The channelization of each transponder is 1×250 MHz and 2×250 MHz. With this frequency channelization plan, the transponder operating point (e.g., the transponder amplifier output back-off (OBO)), can be close to saturation without losing significant satellite power. For example, one method of accessing this transponder is to use three DVB-S2 ACM carriers from the hub of equal carrier power.

Figure 3:
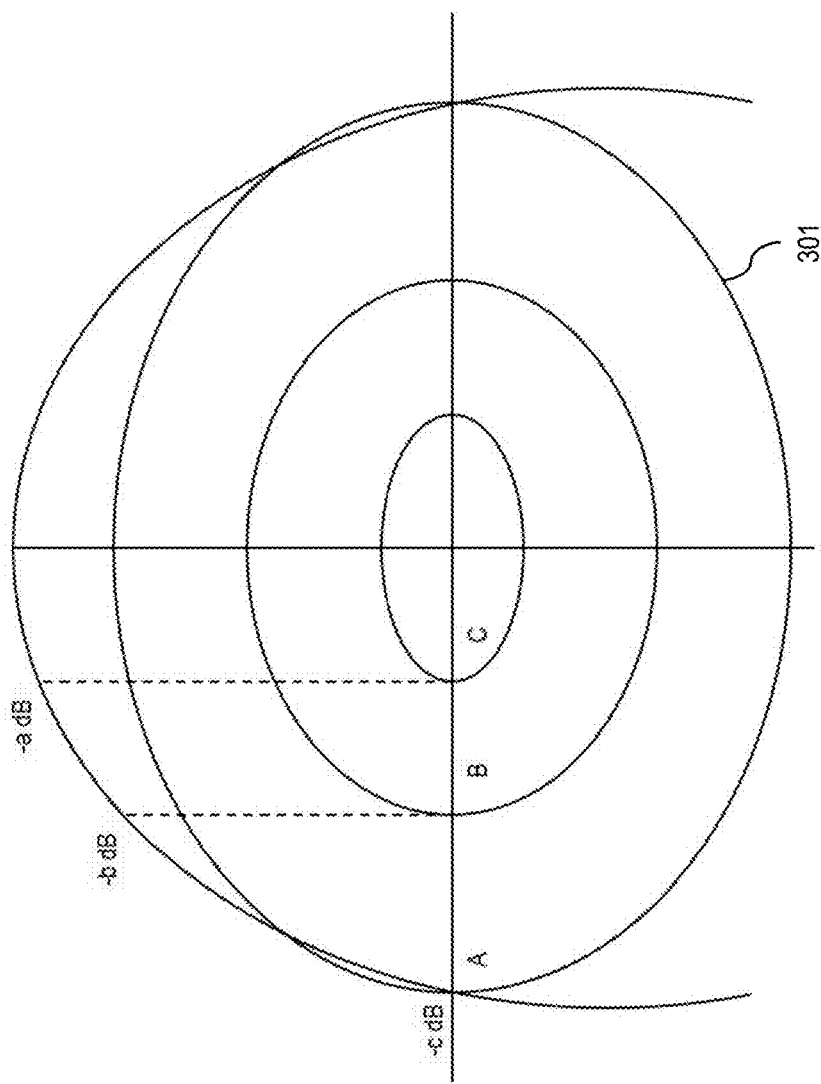
FIG. 3 illustrates a satellite transponder beam divided up into three regions, region A, region B and region C, in accordance with example embodiments of the present invention.

FIG. 3 illustrates a satellite transponder beam 301 divided up into three regions, region A, region B and region C, in accordance with example embodiments of the present invention. For illustrative purposes, it will be assumed that the remote terminals are evenly distributed throughout the beam (and accordingly throughout each of the three depicted regions). Further, the satellite power or EIRP as received by terminals at the outer edge of each of the regions, relative to the EIRP received at the beam center, would be −a dB lower at the edge of region C, −b dB lower at the edge of region B, and −c dB lower at the edge of region A. It follows that the maximum data rate for those terminals near the edge of region A would be dictated by the maximum modulation and coding scheme consistent with the available clear-sky C/(N+I) received. Further, higher data rates would be achievable by employing higher modulation and coding schemes for terminals in region B due to the availability of higher satellite EIRP. Yet, still higher data rates would be achievable by using even higher modulation and coding schemes for terminals in region C due to the availability of yet even higher satellite EIRP (which peaks at the beam center). Accordingly, in view of the assumed even distribution of terminals throughout the beam, and based on the size of each region, region A would include significantly more terminals than region B, which in turn would include significantly more terminals than region C. The overall achieved beam capacity would thus be significantly impacted by the large number of terminals near the beam edge, respecting which the achievable data rates are maximally impacted due to the lower EIRP received at the beam edge. As described above, therefore, the achievable efficiency or optimization in overall beam capacity potential would be significantly limited.

Figure 4:
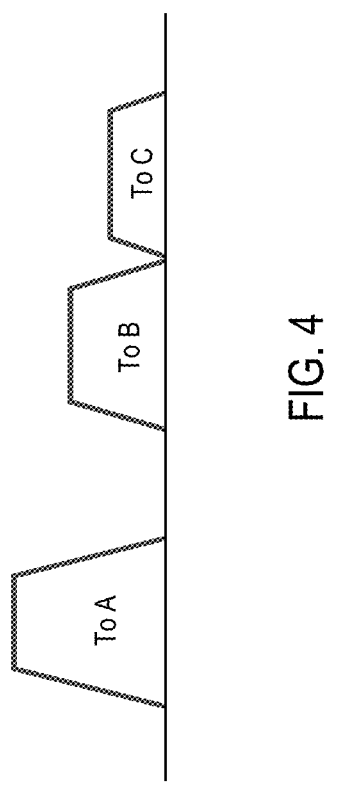
FIG. 4 illustrates a satellite transponder frequency plan, relative to the 1.4 GHz transponder of FIG. 2A, wherein an unequal power level is allocated to each of the three carriers, in accordance with example embodiments of the present invention.

According to example embodiments of the present invention, therefore, an approach is provided for optimizing the power utilization of a satellite spot beam transponder, and thereby optimizing the modulation and coding scheme assignments and the associated data rate for terminals across the entire transponder beam. In other words, the power allocation across the beam is adjusted to maximize the modulation and coding level achievable by terminals throughout the beam based on their respective locations within the beam. FIG. 4 illustrates a satellite transponder frequency plan, relative to the 1.4 GHz transponder of FIG. 2A, wherein an unequal power level is allocated to each of the three carriers, in accordance with example embodiments of the present invention. In accordance with such example embodiments, with reference to FIG. 3, the transponder spot beam 301 is divided into three regions by three concentric rings, each forming an outer edge of a respective region. The beam is thereby divided into a center region C, a middle region B and an outer region A. Further, the regions are divided such that the population of user terminals (UTs) within each region forms a regional group of a relatively equal number of terminals as the other regions. From the satellite, each carrier of the transponder beam 301 is assigned to or serves only the group of terminals of a respective region, and thus three carriers respectively serve the terminals of the three regions A, B, C. Under the scenario where the regions are set so that each region contains an approximately equal number of UTs, therefore, each carrier would be responsible for a relatively equal amount of capacity (each carrier would be serving an approximately equal population of UTs). Alternatively, the regions may be set based on the assumption of an equal UT distribution throughout the beam, and thereby each beam region would be set to cover a relatively equivalent geographical area. As would be recognized, however, this alternative would result in a less accurate (and thus less efficient) power allocation amongst the carriers based on the actual number of UTs residing in each region.

In this manner, according to example embodiments, by taking advantage of the geographical location of a UT within the beam (e.g., based on its region), the overall transponder power for that beam can be optimally allocated amongst the three carriers, to achieve an ideal assignment of available modulation and coding schemes (mod/cod schemes) to each of the respective terminal groups. As noted above, UTs at the beam center may realize and advantage of upwards of 4 dB or more over the UTs located near the edge of the beam. Accordingly, the UTs near the center of the beam can achieve substantially equivalent mod/cod schemes at upwards of 4 dB less transmission power. By way of example, the carrier power for the UT group in region A (near the beam edge) would be increased to facilitate the application of higher mod/cod schemes than would be achievable under the equal carrier power scenario. Correspondingly, respective lower carrier powers can be allocated to each of the carriers bearing the traffic for the UT groups in regions B and C (based on the significant geographical advantage with respect to received EIRP that these terminals experience—for example, based on a significant geographical location advantage in terms of spot beam antenna pattern gain). In other words, based on the geographical advantage, a UT located closer to the beam center would not require as much transmit power to reliably receive and decode a transmission of a given mod/cod scheme as would a UT located further from the beam center (closer to the beam edge). Accordingly, the inner regions can operate at a relative power reduction, and the reduction in power to those UTs can be applied to the geographically disadvantaged UTs—resulting in maintaining the overall power utilized by the transponder at the same level as with the equal power assignment scenario. The optimization of the mod/cod scheme assignments to each of the respective terminal groups, in turn, would result in a more efficient utilization of (e.g., maximize) the capacity delivered to each region and the overall capacity potential of the transponder beam. So, on balance, use of unequal carrier power assignments, in accordance with example embodiments, increases the overall beam capacity as compared to an equal carrier power assignment scenario, while utilizing the same overall power with respect to the respective transponder.

By way of example, the geographical location advantage for terminals in Group A, Group B and Group C may be 0 dB, 1.43 dB and 2.38 dB, respectively. So, to compensate for the EIRP differential due to UT locations, the power assignments can be allocated, relative to the carrier for Group C, to achieve an extra power level of 2.38 dB, 0.95 dB and 0 dB with respect to the Group A, Group B and Group C carriers, respectively. In this manner, the actually received carrier power by terminals at the edge of each group will be the same, thereby enjoying the use of the same mod/cod. Accordingly, the achieved data rate at the edge of the beam for Group A will be higher than the achieved data rate using an equal carrier power assignment.

In practice, however, there are other factors that must be taken into consideration in addition to thermal noise. In accordance with further example, embodiments, therefore, the carrier power allocation can be further optimized by balancing the various interference, noise and other factors that influence the signal transmissions. By way of example, such factors include impairments caused by thermal noise, inter-symbol interference (ISI), adjacent-carrier interference (ACI), inter-modulation (IM) noise degradation, co-channel interference (CCI), cross-polarization interference (XPI) and adjacent-satellite interference (ASI). With the inclusion of the degradation caused by these factors, the resultant total available SNR for terminals at the edge of each region will be degraded, and thus may not be sufficient to support a mod/cod of a higher level than that achievable from the beam edge coverage in the equal carrier power scenario. Accordingly, to compensate for such additional losses, the relative carrier power for regions A, B and C must be optimized by taking into consideration of all of these factors, and, after performing the requisite computations to account for such additional degradation, in some scenarios, an unequal carrier power assignment may not achieve material improvements over the equal carrier power scenario. Moreover, the available mod/cod schemes will depend on system design. For example, in a DVB-S2 compliant system, for example, such available mod/cod schemes would comprise those specified by the current DVB-S2 standard. In that regard, the ability to achieve higher mod/cod levels for a given region may further depend on the granularity of the spread of available mod/cods. In other words, if the system design is such that large gaps exist between mod/cod levels, a jump from one mod/cod scheme to the next available scheme may require more of a power increase for the respective carrier than is available for reallocation within the overall level of the transponder (e.g., without diminishing the power for carriers of the geographically advantaged terminals by an unacceptable level, and degrading the ability of those terminals from being able to reliably receive and decode the same mod/cod scheme).

With further regard to interference considerations, inter-modulation (IM) noise consists of noise between the carriers of a beam caused by the nonlinearities of the high power amplifier of the respective transponder. For a given number of carriers (e.g., three, as in the above examples) at the input of a nonlinear amplifier, the power level and power spectra of each carrier at the amplifier output depend on the nonlinear characteristics of the amplifier and the operating point (or IBO) of the composite signal at the amplifier input. The relative power ratio between the output carriers will not be the same as their relative input power ratio due to weak signal suppression or power robbing conditions at the nonlinear amplifier. The inter-modulation degradation experienced by each carrier depends on carrier type, spectrum, power and frequency assignments. With the above-specified examples, there are three M-ary APSK carriers A, B, C occupying 250 MHz each, with center frequencies, for example, at $-1.47742 \times Rs$, $2.6135 \times Rs$, and $3.7498 \times Rs$, respectively, relative to a hypothetical transponder center frequency of 0 Hz in a 1.4 GHz transponder bandwidth, where Rs is the carrier symbol rate.

As a result of the HPA in this example, there would be a total of nine 3rd-order inter-modulation products (IMPs) between these three carriers after nonlinear amplification—A+B−C, A−B+C, and B+C−A, and 2A−B, 2A−C, 2B−A, 2B−C, 2C−A and 2C−B type. In this scenario, based on simulation analysis, 4 out of these nine 3rd-order IMPs would have direct effect on the desired carriers—the IMPs A+B−C and A−B+C would impact carrier A, and the IMPs 2B−C and 2C−B would impact carriers B and C, respectively. All other 5 IMPs fall into unused spectrum of the beam and thus do not impact any of the three carriers. Further, because the 3rd-order IMPs 2B−C and 2C−B do not affect carrier A, any power level change of carrier A will not impact the 3rd-order IMP onto either carrier B or C, although the power level of carriers B and C at the output of the nonlinear amplifier may suffer some weak signal suppression (or power robbing) by the stronger signals, as noted above. Moreover, for multi-carrier FDMA transmission with reasonable IBO (e.g., −3 dB or −4 dB), the 5th-order IMPs are theoretically much weaker than the 3rd-order, and thus don't exhibit any material effects and can be ignored. If it becomes necessary to operate the nonlinear amplifier closer to saturation, then similar analyses can be performed for all fifteen 5th-order IMPs—9 of A+2B−2C type and 6 of 3A−2B type.

CCI and XPI result from interference of other co-frequency spot beams, and ASI results from interference of other satellites. For a multiple spot beam satellite, beam isolation is realized by both spatial antenna pattern separation and antenna polarization isolation. Due to non-ideal antenna beam isolation or polarization isolation between beams, however, there will be co-channel interference (CCI) and cross-polarization interference (XPI) between user signals in different beams sharing the same frequency spectrum. At beam center, the isolation is better as compared to the isolation at the beam edge. Although the isolation between two adjacent beams can be as high as 30 dB at beam center, there are multiple co-channel beams sharing the same spectrum, which would consequently yield a much lower aggregate CCI and XPI. For example, a typical HTS Ka band multiple spot beam satellite may have 15 co-channel beams sharing the same spectrum. In such a scenario, the resultant aggregate CCI and XPI effects on a given beam from the other 14 beams may range from 15 dB to 25 dB depending on specific beam of interest. This aggregate CCI and XPI from other beams, for both uplink and downlink, should be accounted for in the interference computations for determining an optimal power allocation amongst the three carriers of a transponder. Additionally, for a given satellite, adjacent satellites located in the same geosynchronous orbit and sharing the same spectrum will account for adjacent-satellite interference (ASI) effects in downlink transmissions of the satellite of interest. The aggregate downlink ASI, for example, may be on the order of approximately 18 to 22 dB. Further, ASI effects will also be experienced in the uplink due to leakage uplink transmissions from the respective ground terminals towards the adjacent satellites. The aggregate uplink ASI, for example, may be on the order of approximately 25 dB.

All of these interference considerations will contribute to the total available link C/(N+I). Further, with the presence of these interference effects, the link available C/(N+I) does not change dB for dB with the link C/N. In other words, changing the available link C/N does not change the available link C/(N+I) in a proportional dB for dB fashion. Moreover, in cases of interference effects based on other beams, channels, carriers, etc. (e.g. co-channel interference), which may or may not be active or actively transmitting at any given time, for purposes of computing the interference or degradation effects resulting therefrom, it is assumed that such other contributors are active and/or actively transmitting—in that regard, the worst case scenario is covered, and the results may actually be better where the assumption is incorrect as to one or more of these other interferers.

Figure 5:
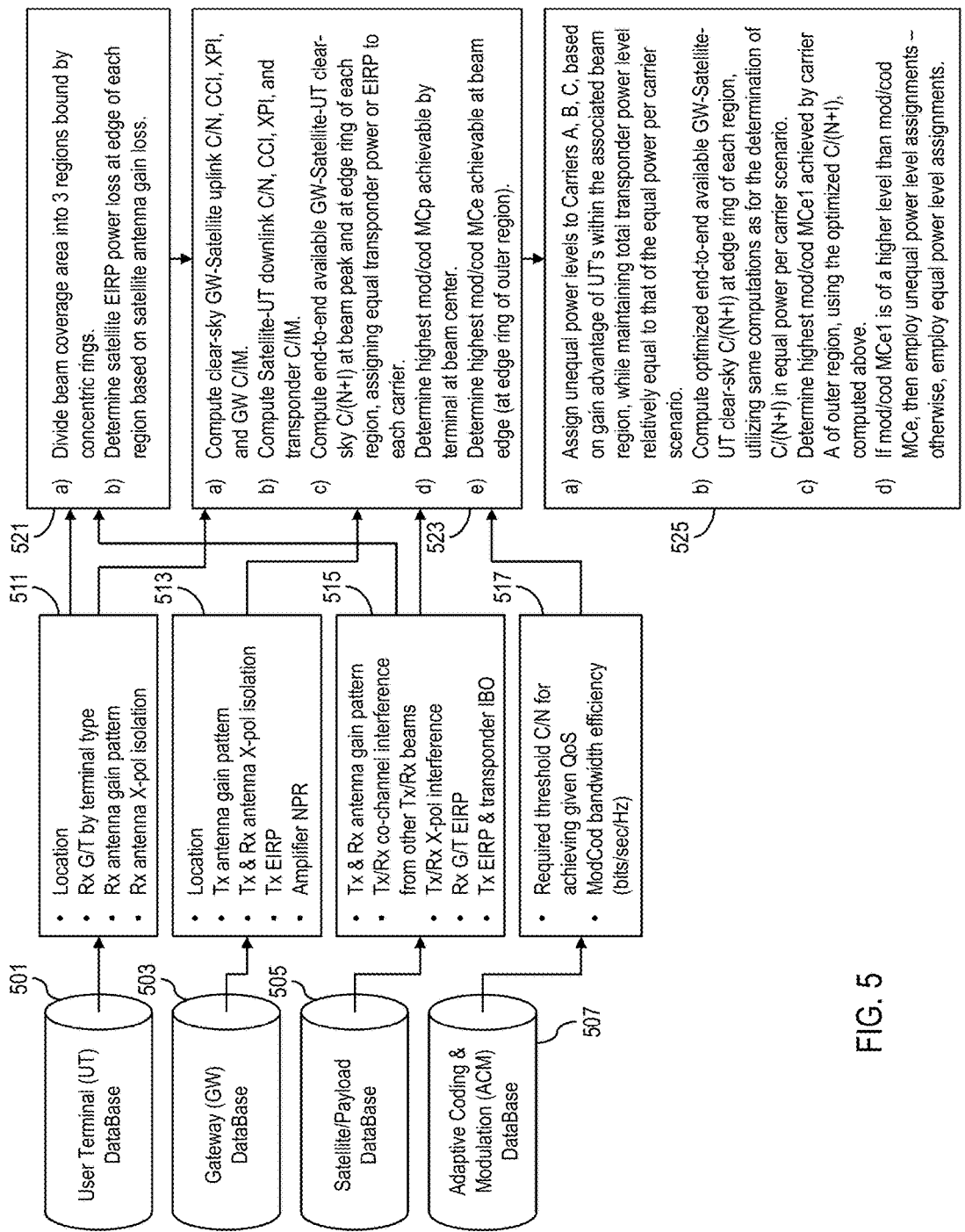
FIG. 5 illustrates a process for optimizing the power utilization of a satellite spot beam transponder, whereby carrier power assignments are adjusted across the carriers of the transponder beam to maximize the FDMA spot beam transponder capacity and the associated data rate for terminals across the entire satellite beam, in accordance with example embodiments of the present invention.

FIG. 5 illustrates a process for optimizing the power utilization of a satellite spot beam transponder, whereby carrier power assignments are adjusted across the carriers of the transponder beam to maximize the FDMA spot beam transponder capacity and the associated data rate for terminals across the entire satellite beam, in accordance with example embodiments of the present invention. With reference to FIG. 5, the databases 501, 503, 505, 507 reflect databases containing information regarding the UT (database 501), the GW (database 503), the satellite/payload (database 505) and the adaptive coding and modulation (database 507) that is used in the computations and determinations to ascertain an optimal power allocation amongst the carriers of the transponder. The boxes 511, 513, 515, 517 identify the information from each database that is utilized for such determinations and computations. The boxes 521, 523, 525 specify the process steps for determining the desired power allocation, with the arrows illustrating the information from the respective boxes 511, 513, 515, 517 that feed the computations and determinations of the process steps. In accordance with example embodiments, the information of the databases 501, 503, 505, 507, as would be recognized, would be drawn from system component designs and specifications (e.g., satellite antenna design, satellite design (e.g., number of beams and number of co-channel beams UT antenna design, amplifier specifications, determined characteristics based on system simulations, measured characteristics based on system operation, operational parameters (e.g., amplifier OBO and IBO settings for system operation), subscriber information (e.g., UT locations), system design (e.g., GW locations), calculated link budgets, etc.

At Step 521(a), the transponder beam coverage area (e.g., the beam 301 of FIG. 3) is divided into three regions by three concentric rings, with each ring forming an outer edge of a respective region (e.g., for nomenclature purposes, the regions can be referred to as the outer or edge region, the middle region and the inner or center region). By way of example the regions are divided such that, based on UT locations, a relatively equal population of user terminals resides in each region. Then each of the transponder carriers A, B, and C is assigned to a respective region (e.g., A, B and C are assigned to the outer, middle and inner regions, respectively). At Step 521(b), the satellite EIRP power loss at the edge of each region ring based on satellite antenna downlink gain loss (e.g., geographical location disadvantage at the edge of each ring relative to the beam peak gain).

In a next phase of the process, the clear-sky available C/(N+I) for the hub-to-user link for the given terminal type of interest, at the beam peak as well as at the edge of each ring, is determined, based on an equal power assignment to each carrier, and based on uplink and downlink CCI and XPI, available beam EIRP, and transponder operating IBO. More specifically, at step 523(a), the clear-sky GW→Satellite C/N, CCI and XPI, and the GW C/IM are determined. Then, at Step 523(b), the clear-sky Satellite→UT downlink C/N, CCI and XPI, and the transponder C/IM are determined. Then, at Step 523(c), the end-to-end available GW→Satellite→UT clear-sky C/(N+I) is determined, at the beam peak and at the edge ring of each region, based on an equal transponder power or EIRP assigned to each carrier. Based on the results of these computations, the highest level achievable mod/cod (MCp) is determined for a UT located at the beam center (Step 523(d)), and the highest level achievable mod/cod (MCe) is determined for a UT located at the beam edge (at the edge ring of the outer region).

In a next phase, a respective transponder power level is allocated to each of the carriers A, B, and C, based on gain advantage of UTs within the associated beam region, while maintaining total transponder power level relatively equal to that of the equal power per carrier scenario (Step 525(a)). By way of example, the transponder power level allocated to each carrier (or the difference in the power level allocated to each carrier relative to the center region carrier) may be proportional to the receive EIRP disadvantage for UTs receiving the carrier relative to the EIRP for UTs receiving the center region carrier. By way of further example, for the determination of the power level allocated to each carrier, the gain advantage of UTs within the associated beam region considered for that determination may be the gain advantage/disadvantage experienced by UTs located at the outer edge of the region. Then, at Step 525(b), the optimized end-to-end available GW→Satellite→UT clear-sky C/(N+I) at the edge ring of each region is determined, utilizing the same computations as for the determination of the C/(N+I) in the equal power per carrier scenario. By way of example, one objective would be to achieve an approximately equal end-to-end C/(N+I) for each of the carriers A, B, C by adjusting their respective power levels accordingly. Then, at Step 525(c), based on the optimized end-to-end available GW→Satellite→UT clear-sky C/(N+I) (determined per the above), the highest achievable level mod/cod scheme (MCe1) is determined. Lastly, at Step 525(d), if the mod/cod scheme MCe1 is of a higher level than the mod/cod scheme MCe, then the unequal power level allocations are employed—otherwise, the equal power level allocations are employed.

Further, in accordance with example embodiments, the determination of the beam regions may be performed in a dynamic or quasi-dynamic manner (e.g., certain of the factors, such as the regional boundaries, can be configurable by a system operator or a software program). By way of example, depending on relative change of UT populations within a beam, the beam regions may be periodically analyzed and re-configured to adjust for such changes. Upon any reconfiguration, the various computations and determinations can be re-performed (e.g., based on any pre-computations that are not affected by the region change, and using the relevant database information for those computations and determinations that are affected by the region change) to determine the optimal carrier power allocations for the new regions. By way of further example, certain regional boundaries may be based on time zone and time of day—whereby, because user patterns may shift based on time of day, the beam regions and associated carrier power allocations may be automatically adjusted to capture any such shift of the active UT population. Moreover, many of the factors that are used in the determinations are fixed (e.g., a database of co-channel interference and cross-pole interference, which are based on the antenna design and do not change, can thus be pre-computed), and the only variable factors become the assignment of the regions, which alters the region edges, and thus changes the analyses regarding the relative advantages of the UTs within each region or at the respective region edges. Then, based on the newly determined relative advantages, the respective carrier power levels can be set accordingly. Accordingly, various preset configurations can be programmed (e.g., in the form of a parameter table), and a switch from one configuration to another (e.g., based on time of day), may be performed simply by table look-up, carrier power adjustment and assignment of user traffic accordingly.

At the gateway, the user traffic would then be assigned to a carrier based on the beam region within which the respective UT resides. By way of example, user data traffic destined for a particular UT are assigned to a carrier based on the beam region within which the respective UT resides. By way of further example, should the nominal carrier have no available capacity, the user data traffic destined may be assigned to the closest neighbor carrier. Additionally, by way of further example, should that neighbor carrier also have no available capacity, the user data traffic may be assigned to the next neighbor carrier with available capacity. Otherwise, the user traffic may be placed in a holding queue until capacity becomes available on any of the carriers or until expiration of a predetermined or configurable duration of time.

Moreover, in accordance with further example embodiments, the proposed approach can be extended to other multiple carrier scenarios. For example, within each of the three sub-bands, there could be multiple carriers of narrower bandwidth (e.g., during initial transponder operational use). The relative power of these smaller carriers can also be optimized in accordance with terminal geographical location advantages. Also, for other transponder channelization, same scheme can be adapted to optimize the overall transponder capacity.

While exemplary embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   determining a respective power level for each of a plurality of carrier signals and allocating each power level to the respective carrier signal; and
   processing the plurality of carrier signals together to generate a single multicarrier transmission signal via a one satellite transponder, and transmitting the multicarrier transmission signal within a one downlink spot beam;
   wherein each of the carrier signals is configured to transport data signals for terminals within a respective region of the one downlink spot beam, and a total power allocated to the plurality of carrier signals does not exceed a desired aggregate power level for the satellite transponder;
   wherein the power level allocated to each carrier signal is determined based on a gain realizable by at least one of the terminals within the respective region of the one downlink spot beam, where the realizable gain of the at least one terminal is based on a location of the respective region within the one downlink spot beam;
   wherein, for the determination of the power level allocated to each carrier, the at least one terminal, relative to which the power level is determined, is at a location within the respective region of the one downlink spot beam whereby the realizable gain is at a relatively minimum level for the region;
   wherein the regions of the one downlink spot beam are bounded by concentric rings located successively further out from a relative center of the one downlink spot beam, such that a center region is bounded by a first of the concentric rings closest to the relative center of the one downlink spot beam, and each successive region is bounded by a one of the concentric rings that forms an outer bound of the preceding region and a next one of the concentric rings that forms an outer bound of the successive region; and
   wherein the power level allocated to at least one of the carriers is different from the power level allocated to at least another one of the carriers.

2. The method according to claim 1, wherein each terminal within a given region of the one downlink spot beam is assigned to receive the respective carrier signal associated with that region, and the determination of the power level allocated to each carrier is configured to maximize a level of modulation and coding schemes realizable by the terminals within the respective region of the one downlink spot beam.

3. The method according to claim 1, wherein the regions of the one downlink spot beam are formed such that each region contains a relatively equal number of terminals as the other regions.

4. The method according to claim 1, wherein, for the determination of the power level allocated to each carrier, the at least one terminal, relative to which the power level is determined, is located at or just within the concentric ring that forms the outer bound of the respective region of the one downlink spot beam.

5. The method according to claim 1, wherein the power level allocated to each carrier signal is determined to optimize the allocation of the total power amongst the plurality of carrier signals based on the location of the respective regions within the one downlink spot beam.

6. The method according to claim 1, wherein the realizable gain of the at least one terminal is a maximum realizable gain.

7. A satellite comprising:
a processor; and
a transponder; and
wherein the processor is configured to determine a respective power level for each of a plurality of carrier signals, and to allocate each power level to the respective carrier signal, the power level allocated to at least one of the carriers being of a different level than the power level allocated to at least another one of the carriers,
wherein the transponder is configured to process the plurality of carrier signals together to generate a single multicarrier transmission signal for transmission within a one a downlink spot beam including the plurality of carrier signals with each configured based on the allocated power level,
wherein each of the carrier signals is configured to transport data signals for terminals within a respective region of the one downlink spot beam, and a total power allocated to the plurality of carrier signals does not exceed a desired aggregate power level for the transponder, and
wherein the processor is configured to determine the power level allocated to each carrier signal based on a gain realizable by at least one of the terminals within the respective region of the one downlink spot beam, where the realizable gain is based on a location of the respective region within the one downlink spot beam,
wherein, for the determination of the power level allocated to each carrier, the at least one terminal, relative to which the power level is determined, is at a location within the respective region of the one downlink spot beam whereby the realizable gain is at a relatively minimum level for the beam region, and wherein the regions of the one downlink spot beam are bounded by concentric rings located successively further out from a relative center of the one downlink spot beam, such that a center region is bounded by a first of the concentric rings closest to the relative center of the one downlink spot beam, and each successive region is bounded by a one of the concentric rings that forms an outer bound of the preceding region and a next one of the concentric rings that forms an outer bound of the successive region.

8. The apparatus according to claim 7, wherein each terminal within a given region of the one downlink spot beam is assigned to receive the respective carrier signal associated with that region, and the determination of the power level allocated to each carrier is configured to maximize a level of modulation and coding schemes realizable by the terminals within the respective region of the one downlink spot beam.

9. The apparatus according to claim 7, wherein the regions of the one downlink spot beam are formed such that each region contains a relatively equal number of terminals as the other regions.

10. The apparatus according to claim 7, wherein, for the determination of the power level allocated to each carrier, the at least one terminal, relative to which the power level is determined, is located at or just within the concentric ring that forms the outer bound of the respective region of the one downlink spot beam.

11. The apparatus according to claim 7, wherein the power level allocated to each carrier signal is determined to optimize the allocation of the total power amongst the plurality of carrier signals based on the location of the respective regions within the one downlink spot beam.

12. The apparatus according to claim 7, wherein the realizable gain of the at least one terminal is a maximum realizable gain.

* * * * *